June 11, 1963   E. F. MACKS   3,093,380
SEALING MEMBER AND METHOD
Original Filed Oct. 14, 1954

INVENTOR.
ELMER FRED MACKS
BY
Watts, Edgerton, Pyle & Fisher
ATTORNEYS

United States Patent Office 3,093,380
Patented June 11, 1963

3,093,380
SEALING MEMBER AND METHOD
Elmer Fred Macks, Willow Lane, Vermilion, Ohio
Original application Oct. 14, 1954, Ser. No. 462,195, now Patent No. 3,001,806, dated Sept. 26, 1961. Divided and this application Sept. 26, 1961, Ser. No. 140,791
9 Claims. (Cl. 277—1)

This invention relates to seal assemblies and more particularly to seals in which the sealing selement is lubricated during operation by the fluid which is being sealed against, the sealing member being capable of producing a fluid film between the member and other parts of the assembly which positions the member in continuously spaced relation with such other parts.

This application is a division of my copending application Serial No. 462,195, filed October 14, 1954, under the same title, and now Patent No. 3,001,806.

In general, mechanisms having relatively shiftable parts which are subject to sliding contact require a supply of lubricant to such areas that function as load-carrying surfaces to lessen friction and wear. The surfaces are covered with a lubricant such as oil or grease to obtain a film for separating the surfaces. The adequacy of this method of wear prevention is dependent upon a continuous and adequate supply of the lubricant. Further, the lubricant must be maintained in good condition to support the load-carrying surfaces out of sliding contact. Under conditions of speed and extreme heat, the lubricant loses the necessary ability to maintain the film with the result that wear, damage, and eventual destruction occurs.

The use of the ambient fluid as the film substance constitutes a solution to the ordinary problems attendant to the use of oils and greases. No question of supply exists when the ambient fluid is used, and even in the case of air or a gas, breakdown or loss of lubricating qualities will not result from adverse conditions. The production of an adequate film of fluid for separating relatively moving surfaces is accomplished by properly introducing the fluid at pressures and in quantities which will support the surfaces in operating relationship without physical contact. In many applications of this principle, ambient fluid at the necessary conditions is available in the environment without additional supply facilities being required. This results in obvious reductions in original and maintenance costs since the need for a supply of a lubricant continuously or at regular intervals is eliminated.

To obtain a self-supporting sealing member which will function even with air as the supporting medium, the member may be formed from a foraminous material, such as sintered brass, which has a large number or tortuous paths for conducting the fluid to the support surface. If there is little resistance to flow at the support surface, a large pressure drop through the foraminous material results. Thus, a very small pressure remains at the support surface to produce the load-carrying film. The reduction of the film pressure would allow the sealing member to approach the associated structure which would increase the resistance of flow through the film area. The flow through the foraminous material would be reduced with the result that the pressure drop therethrough would also be reduced, thus increasing the remaining pressure at the support surface. The supporting ability of the film, therefore, is in direct relation to the proximity of the member producing the film to an adjacent body. This feature renders the assembly self-adjusting and self-regulating as required for continuous operation of a sealing member in spaced relation with adjacent structure.

Accordingly, one of the objects of this invention is to provide a sealing member capable of forming a fluid film between the member and associated structure.

Another object of this invention is to provide a seal assembly which has a permeable, foraminous or perforate member for forming a film capable of supporting the member in spaced relation with other parts of the assembly, thus rendering the member self-supporting.

Still another object of the invention is to provide a ring-like sealing member that is capable of being automatically radially self-adjusted to maintain predetermined spacing between the scaling member and associated structure surrounded by the ring-like member.

Other objects and advantages and the manner in which all the various objects are realized will appear in the following description which, considered in connection with the accompanying drawings, sets forth the preferred embodiments of the invention.

Figure 1:
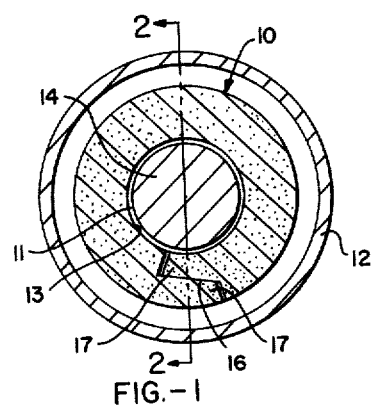
FIGURE 1 is a cross-sectional view illustrating a seal assembly embodying the invention mounted for cooperation with a shaft.
Figure 2:
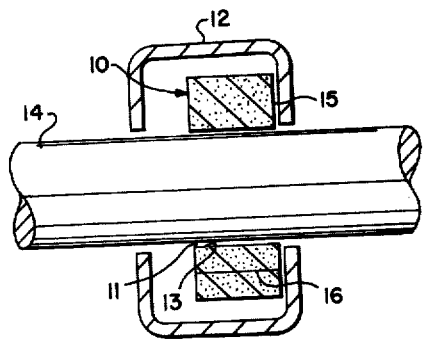
FIGURE 2 is a cross-sectional view taken along the line 2—2 of FIGURE 1.

Referring now to the drawings, and to FIGURES 1 and 2 in particular, there is shown a seal assembly which includes a ring 10 formed from a foraminous material, such as sintered metal. The ring 10 is located within a housing 12 which may be stationary and a part of a machine frame. The ring 10 circumscribes a shaft 14 and a slight clearance or fluid film region 11 is provided between the interface 13 of the ring 10 and the shaft 14 so that the shaft 14 may run free of the ring. It is noted that the shaft 14 may be of either the rotating or reciprocating type.

The proximity of the interface or inner wall 13 of the ring 10 to the shaft 14 allows the production of a film of fluid which maintains the radial spacing of the ring 10 relative to the shaft 14, as will hereinafter be more fully discussed. Further, a partial film is formed between the end wall 15 of the ring 10 and the inner end wall of the housing 12. The ring 10 therefore, is supported out of contact with the shaft 14, and the partial fluid film which is produced between the ring 10 and the housing 12 reduces contact pressure therebetween. The seal is particularly adapted for operation of air since slight leakage of air is generally not objectionable. Shaft and rod seals such as found in air compressors or turbines are particularly suitable to the use of this type of seal which may utilize the air pressure produced by the machine in the seal assembly to obtain the supporting or spacing film.

As shown in FIGURE 2, the seal 10 will be urged toward one end wall of the housing 12 by an axial pressure difference existing across the seal. Primary leakage through the foraminous seal ring 10 is limited therefore to the surface portion of the ring confronting the shaft 14, which portion is the interface 13. This leakage results in a pressure buildup in the fluid film region 11 which radially locates and positions the ring 10 out of contact with the shaft 14. Since there is negligible frictional force between the shaft 14 and the ring 10 when air is used as the spacing medium lubricant, no relative motion will exist between the ring 10 and the housing 12. If frictional drag causes the ring to rotate, a cooperating irregularity (also not shown) may be provided on the ring 10 to prevent rotation. Such an irregularity need not confine the ring 10 radially inasmuch as it is desirable at times to allow radial freedom of ring 10 to accommodate misalignments and deflections.

The pressure available for supporting and positioning the ring 10 is directly related to the flow which is established through the fluid film region between the ring 10 and the shaft 14. As any given portion of the ring 10 shifts away from the shaft 14, the flow increases and the pressure drop through the foraminous wall of that portion of the ring 10 also increases, thus reducing the pressure and force tending to radially urge such portion of the ring away from the shaft. Concurrently, the clearance is reduced on the diametrically opposite side of the shaft 14 which reduces the flow and increases the pressure and force available to urge that side of the ring 10 away from the shaft 14. Therefore, the foraminous ring cooperates with the shaft 14 to self-regulate the forces acting to position the ring 10 with clearance between the interface 13 of the ring 10 and the shaft 14 at all times. Since there is no contact, no wear or deterioration of the ring results from continued relative movement between the ring 10 and the shaft 14.

According to the invention, the ring 10 is split, as indicated at 16 to afford radial flexibility. Because of this construction, flexure of the ring will change its inside diameter. This flexure allows automatic radial spacing of the ring relative to the shaft 14. The closure dimensional tolerances that might be required in a solid seal ring construction are thus eliminated by the split ring 10.

Figure 3:
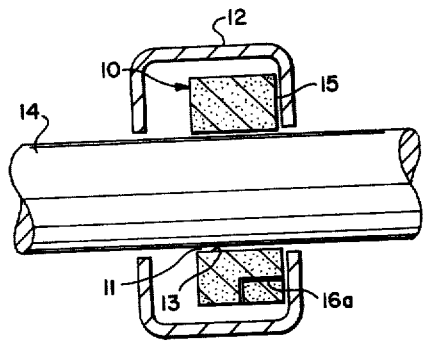
FIGURE 3 is a view similar to FIGURE 2, but illustrating a modified construction of the seal assembly.

Preferably, the free ends 17 of the split ring 10 are shaped to overlap in order to minimize leakage at the joint. An alternative construction of this overlap is illustrated in FIGURE 3 at 16a.

When a sealing ring 10 is used with a horizontal shaft, the ring 10 may be slightly eccentric relative to the shaft 14 as shown in FIGURE 2 due to the effect of gravity operating on the ring 10. However, the ring 10 would position itself essentially concentric to a vertical shaft since the only forces acting on the ring in radial direction would be those of the spacing film be it gaseous or liquid.

Figure 4:
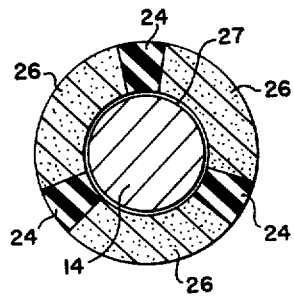
FIGURE 4 is a cross-sectional view illustrating another embodiment of the invention; and, FIGURE 5 is a cross-sectional view illustrating still another embodiment of the invention.

Flexibility in the foraminous seal ring may also be obtained by segments of resilient material, which may be permeable or nonpermeable as desired, disposed between segments of rigid foraminous material. In the embodiment illustrated in FIGURE 4, the flexible segments 24 are located between relatively rigid foraminous ring segments 26. The existence of the flexible segment 24 allows the ring to change diameter to a small degree. This renders the ring radially self-adjusting, since the segments 26 will be positioned relative to the shaft 14 by the pressure in the fluid film region 27 between the shaft 14 and the segments 26. The entire foraminous ring may be made flexible and resilient if desired.

Figure 5:
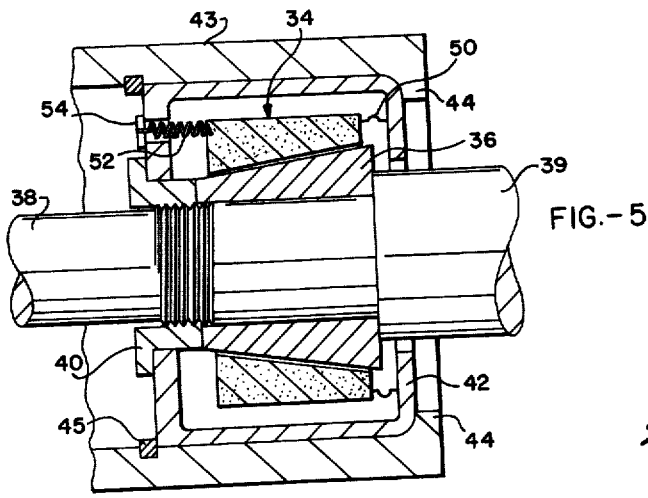

The seal assembly of the invention may be provided in cartridge form wherein the elements are preadjusted. Such a construction is illustrated in FIGURE 5 and includes a foraminous sealing ring 34 having a conical inner wall. This conical inner wall of the ring 34 confronts a complementary outer conical surface formed on a bushing 36 mounted on a shaft 38. The bushing 36 is shown to be held in place between an enlarged portion 39 of the shaft 38 and an annular collar 40 that is adjustably threaded on the shaft. It is noted that the conical surface on the bushing 36 could be formed directly on the shaft 38 since the manufacturing tolerances would be increased by the use of the conical configuration.

The sealing ring 34 is located within a housing that includes a cage 42 mounted on a sleeve 43. This sleeve has a radially inturned flange 44 against which the cage is held by the collar and by a snap ring 45. As shown, the cage 42 fits against the inner surface of the sleeve 43.

A flexible diaphragm 50 lies between the cage 42 and the ring 34 and prevents leakage of fluid around the end of the seal without imposing a restraining force on the ring 34. The diaphragm 50 is extremely flexible in a radial direction so that the ring 34 may be positioned and carried by a film of fluid developed between the ring 34 and the bushing 36 in the manner discussed in connection with the embodiment of FIGURES 1 and 2. Since the cross section of the ring 34 tapers, the fluid under pressure tends to urge the ring 34 in the direction toward the small end thereof. This movement renders the ring 34 radially self-adjusting with respect to the shaft 38.

A tension member in the form of a spring 32 is fixed to the ring 34 and has an adjusting screw 54 carried by the cage 42 for adjustably holding the opposite end of the spring. The spring 52, therefore, may be adjusted to balance the fluid force on the ring 34 so that both lateral and radial self-adjustment of the seal is obtained. The axial restraining spring 52 may be in the form of any resilient material and may be located on either the high or low pressure faces of the foraminous ring, depending on whether tension or compression action is desired.

In order to minimize seal vibration, certain values of expansion ratio and volume factor have been found to be desirable. The permeability of the material used in the sealing member is controlled so that under normal conditions the fluid expansion ratio through the seal is less than 11, which value limits the volume of flow through the film, thus eliminating vibration in the sealing member.

The volume of fluid directly connected to the film must also be restricted to a value at which vibration of the seal will not occur. The volume factor is obtained by the relationship of the volume of the hollowing or grooves in the sealing surface to the area of the seal. This factor should be no greater than $2 \times 10^{-3}$ for the optimum results in the operation of the seal.

Although the foregoing description is necessarily of a detailed character, in order that the invention may be completely set forth, it is to be understood that the specific terminology is not intended to be restrictive or confining; and that various rearrangements of parts and modifications of design may be resorted to without departing from the scope or spirit of the invention as herein claimed.

What is claimed is:

1. A fluid seal assembly comprising a movable shaft means having a circumferential sealing surface; a housing surrounding said shaft means; and sealing means carried within said housing for sealing cooperation with the sealing surface of said shaft means, said sealing means including a foraminous ring in floating relationship both longitudinally and transversely of said shaft means, said foraminous ring having a radially inner surface complemental to the sealing surface of said shaft means and another surface exposed to a quantity of fluid under pressure when said seal assembly is operative, said radially inner surface of said ring and said sealing surface of said shaft means defining a fluid film producing region for containing a sealing film of fluid under pressure to hold said ring and shaft means in spaced relationship, the fluid being supplied to said region at least in part by flow through said ring from its exposed surface to its radially inner surface, and self-adjusting means for permitting the radially inner surface of said ring to move toward and away from said sealing surface of said shaft means and vary the extent of said fluid film producing region.

2. The fluid seal assembly as claimed in claim 1 wherein said ring is formed in arcuate, foraminous segments, and wherein said self-adjusting means comprises pieces of flexible material interposed between the ends of said segments for permitting said ring to radially expand and contract relative to said shaft means.

3. The fluid seal assembly as claimed in claim 1 wherein said shaft means includes a substantially conical portion having an outer surface angularly disposed relative to the longitudinal axes of said shaft means, said outer surface constituting the sealing surface of said shaft means; and wherein said self-adjusting means comprises a flexible diaphragm disposed between said housing and one end of said ring, and a tensioning means disposed between said housing and the other end of said ring for balancing the fluid force exerted on said ring.

4. The fluid seal assembly as claimed in claim 1 wherein said self-adjusting means is formed by a radial break through one wall of said ring for permitting limited radial expansion of said ring.

5. The fluid seal assembly as claimed in claim 4 wherein the free ends of said ring formed by said radial break are overlapped for preventing fluid leakage through the seam formed thereby.

6. A fluid seal assembly comprising a movable shaft, a housing surrounding said shaft, said housing having a fluid entrance at one end and a radially extending wall at its opposite end, an annular, foraminous ring carried within said housing in floating relationship both transversely and longitudinally of said shaft, said ring being operatively disposed in sealing contact with the end wall of said housing and in spaced relationship with said shaft, the radially inner surface of said ring and the surface of said shaft defining a region or maintaining a sealing film of fluid under pressure, the fluid film generated in said region being supplied in part by restricted fluid flow from said housing through said foraminous ring, and said ring being formed to permit radial expansion and contraction to thereby vary the extent of said fluid film region.

7. The fluid seal assembly as claimed in claim 6 wherein said ring is formed in arcuate, foraminous segments and includes flexible pieces of material disposed between the ends of said arcuate segments.

8. The fluid seal assembly as claimed in claim 6 wherein said ring is formed with a radial break through one wall, the end of the ring formed by said break being overlapped for preventing fluid leakage through the seam formed thereby.

9. A method of sealing a quantity of gas under pressure in a chamber defined at least in part by a shaft and an annular housing circumferentially disposed about said shaft comprising the steps of positioning an annular foraminous ring around the shaft and in an annular recess in the housing, allowing the ring to float both radially and axially relative to the housing and the shaft, generating a load-carrying and sealing film of gas in a gas film region between the ring from an exposed surface in the housing to the gas film region defined by the radially inner surface of the ring and the complemental outer surface on the shaft, supporting the ring on the film of gas to maintain the ring in spaced relationship with the shaft while allowing gas to escape axially from the region at one end of the housing, and allowing the ring to move toward and away from the complemental surface on the shaft so as to vary the extent of gas film region.

No references cited.

UNITED STATES PATENT OFFICE
CERTIFICATE OF CORRECTION

Patent No. 3,093,380                      June 11, 1963

Elmer Fred Macks

It is hereby certified that error appears in the above numbered patent requiring correction and that the said Letters Patent should read as corrected below.

Column 5, line 22, for "or" read -- for --.

Signed and sealed this 31st day of December 1963.

(SEAL)
Attest:
ERNEST W. SWIDER

EDWIN L. REYNOLDS

Attesting Officer                    Acting    Commissioner of Patents